No. 883,989. PATENTED APR. 7, 1908.
J. S. WALTON.
COMBINED WAGON BED AND HAY RACK.
APPLICATION FILED JUNE 12, 1907.
2 SHEETS—SHEET 2.
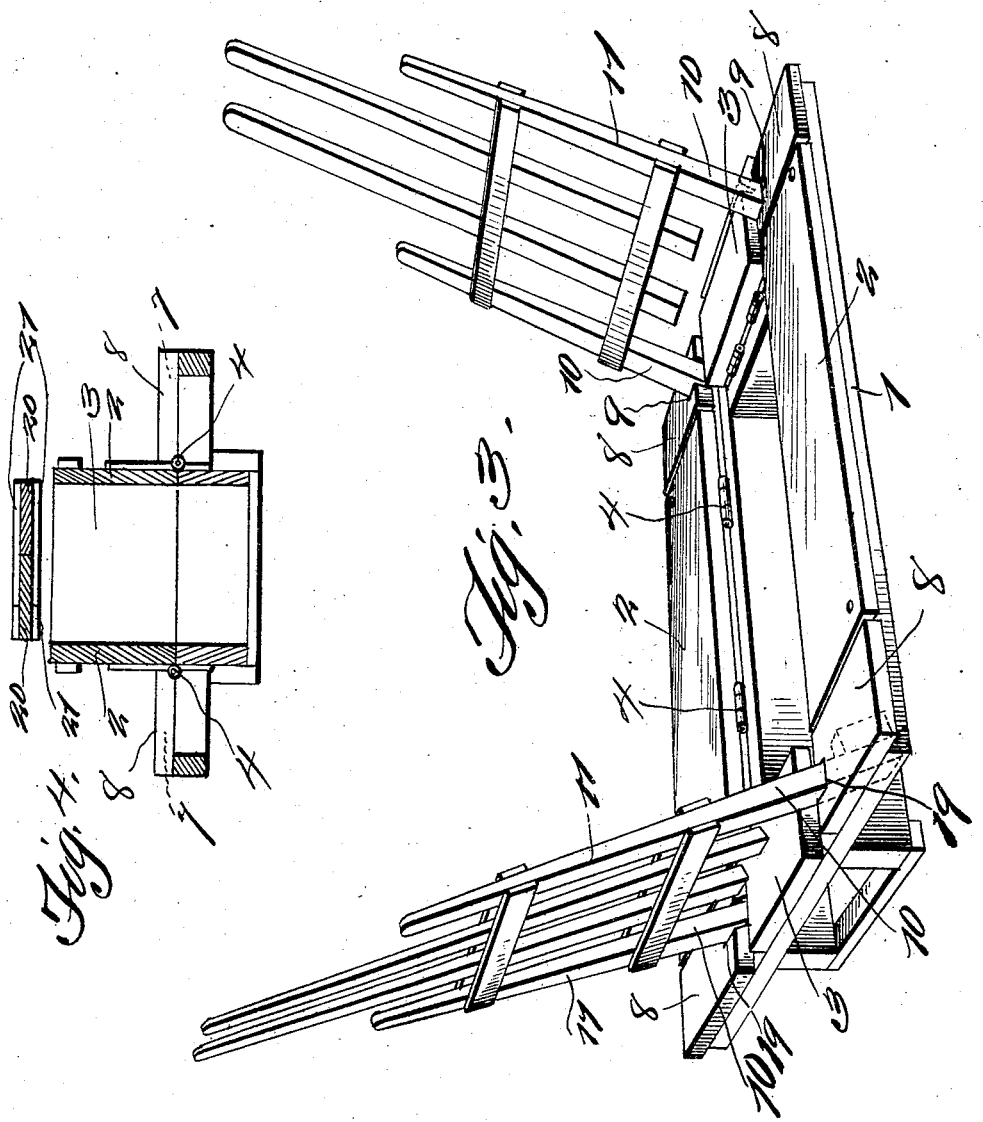
Witnesses
Inventor
J. S. Walton.
By Dean Swift
Attorney

UNITED STATES PATENT OFFICE.

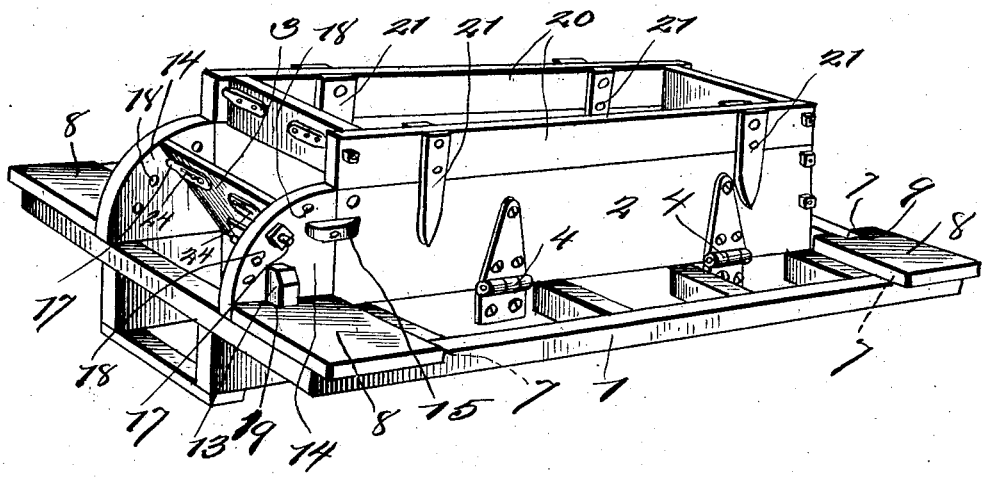

JOHNSON S. WALTON, OF GEORGETOWN, KENTUCKY.

COMBINED WAGON-BED AND HAY-RACK.

No. 883,989.  Specification of Letters Patent.  Patented April 7, 1908.

Application filed June 12, 1907. Serial No. 378,648.

*To all whom it may concern:*

Be it known that I, JOHNSON S. WALTON, a citizen of the United States, residing at Georgetown, in the county of Scott and State of Kentucky, have invented certain new and useful Improvements in a Combined Wagon-Bed and Hay-Rack, of which the following is a specification, reference being had therein to the accompanying drawing.

This invention relates to a new and useful combination wagon-bed and hay rack, which is easily convertible from one to the other, without any inconvenience on the part of the user, thereby obviating the necessity of displacing a complete wagon-bed for a complete hay rack bed, or vice versa.

The invention aims as a further object to provide a device of this character, comprising simple and efficient construction which will render the above set forth invention, convertible.

The invention comprises further objects and combinations of features, which will be hereinafter described and particularly pointed out in the appended claims.

Figure 1 is a perspective view showing the invention constructed as a wagon bed. Fig. 2 is a perspective view showing the upper extensions of the sides and ends of the wagon removed and the extensions of the sides placed in coöperation with one another to form a bottom to the wagon bed. Fig. 3 is a perspective view of the device, illustrating the same for use as a hay rack. Fig. 4 is a transverse sectional view taken through the body and showing the sides and ends 2 and 3 in a vertical position.

Making renewed reference to the accompanying drawings, wherein similar reference characters indicate corresponding parts in the several illustrations, by figures, 1 designates a rectangular framework, to the sides and ends of which, are hinged the sides and ends 2 and 3 of the body of the wagon as at 4. When the sides and ends are thrown vertically as shown in Fig. 2, rods 5 are utilized which are passed through registering apertures of the said sides and in front of the front end 3, of the wagon body.

The rectangular framework 1, is provided at each end, with corners 8, which form recesses 7, so that when the said sides and ends are thrown down, their upper surfaces will be flush with the corners 8 of said framework. The corners are provided with small recesses 9 and 19, to receive the lower ends 10 of the outer beams 11 of the racks, as clearly shown in Fig. 3. The recesses of the rear corners of the wagon body are designed, not only to receive the beams of the rear rack, but also the ends of the cleats 13, carried by the quarter section 14 forming an extension to the wagon body.

To prevent the quarter sections from falling toward the center of the body, latches 15 are provided to engage the sides. When the quarter sections 14 are utilized, the end of the body adjacent thereto may be adjusted at different inclinations, by means of adjustable rods 17 having slots 24. These rods are designed to engage any one of the plurality of apertures 18 of the said quarter sections, as will be clearly understood.

When it is desired to use the wagon body for hauling soil, grain, and the like, the side extensions 20, as shown in Fig. 1, are removed, and their edges are placed adjacent one another, after which, they are held by the cleats 21, which engage the opposite faces of the said extensions. These extensions when fixed in this manner are placed between the sides and ends of the body to form a bottom therefor.

Having thus described my invention, what is claimed as new and useful is,

1. In a device of the class described, a rectangular body having pivoted sides and ends, said body having front and rear recesses, and a pair of racks adapted to engage said recesses.

2. In a combination wagon-bed and hay-rack, a rectangular body having pivoted sides and ends, rods to hold them together, said body having recesses, quarter sections forming extensions, said quarter sections having cleats to be received by said recesses, the rear end being designed to be disposed at various inclinations between said quarter sections, and rods supporting the same.

In testimony whereof I hereunto affix my signature in presence of two witnesses.

JOHNSON S. WALTON.

Witnesses:
 JAMES BRADLEY,
 J. L. McINTIRE.